Aug. 11, 1931.  V. G. APPLE  1,818,779
OSCILLATING MOTOR
Filed Sept. 6, 1929  3 Sheets-Sheet 1
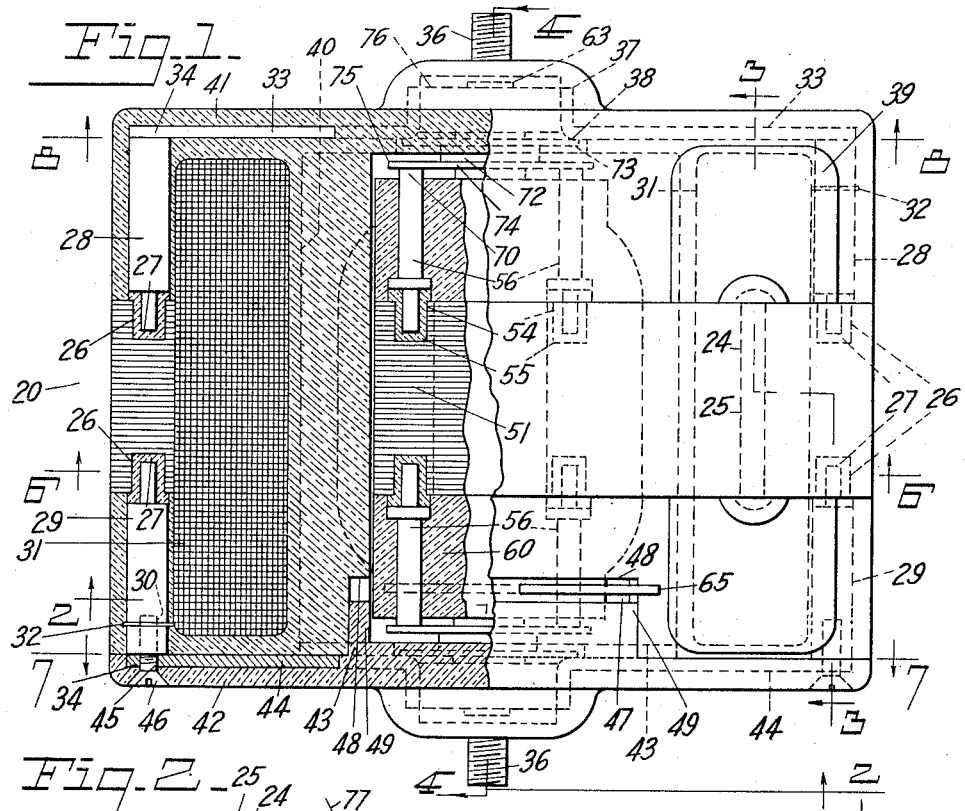
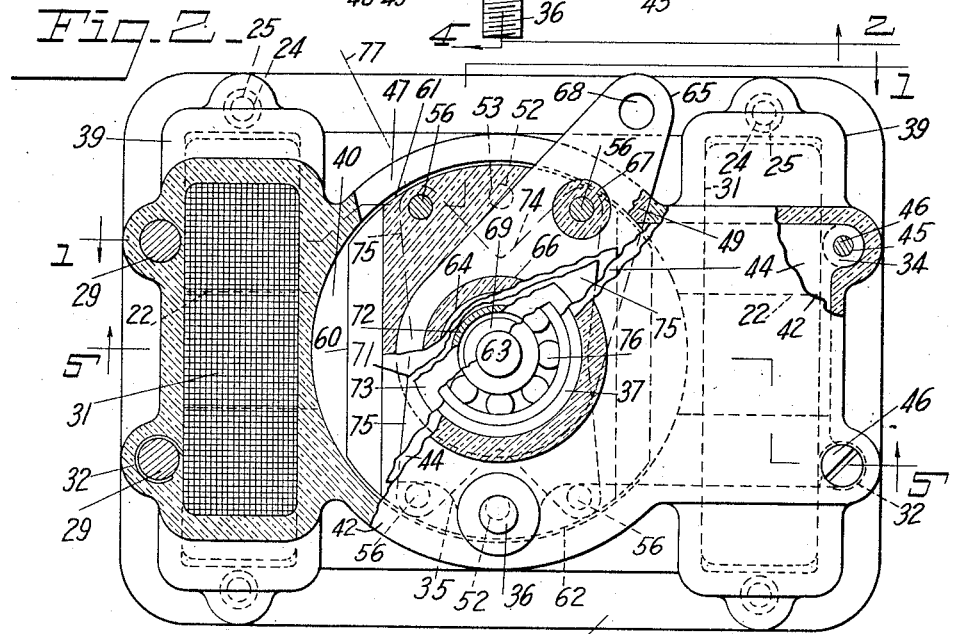
INVENTOR
Vincent G. Apple

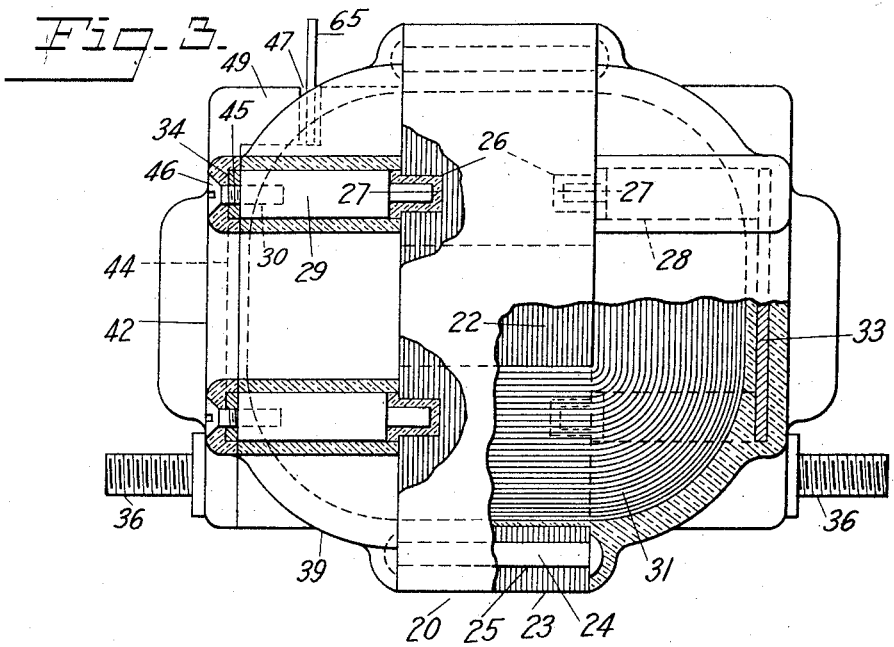
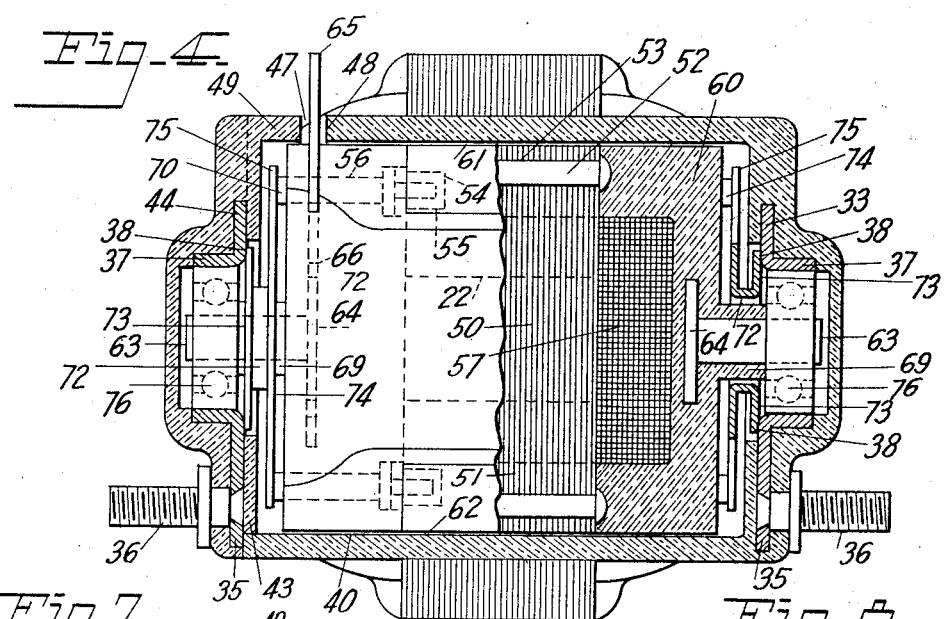
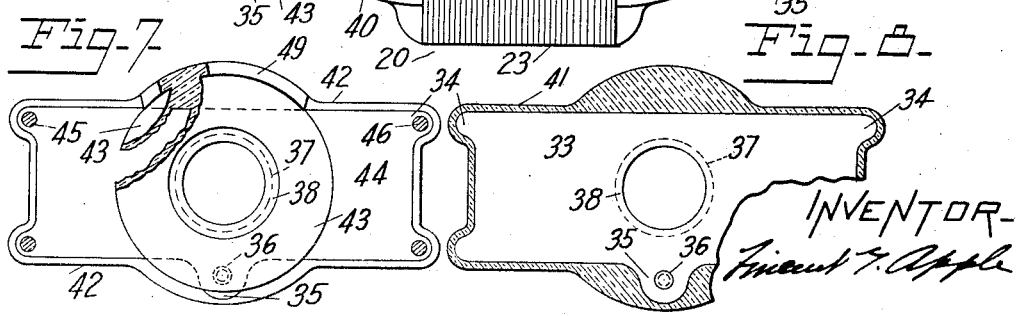

Aug. 11, 1931.    V. G. APPLE    1,818,779
OSCILLATING MOTOR
Filed Sept. 6, 1929    3 Sheets-Sheet 3
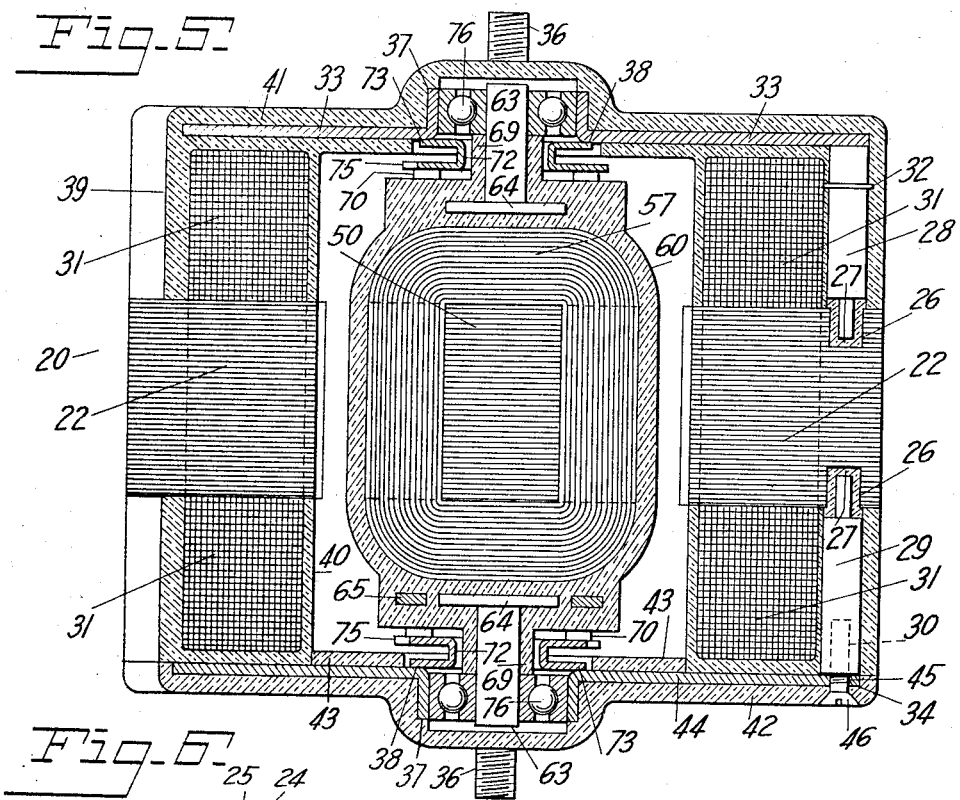
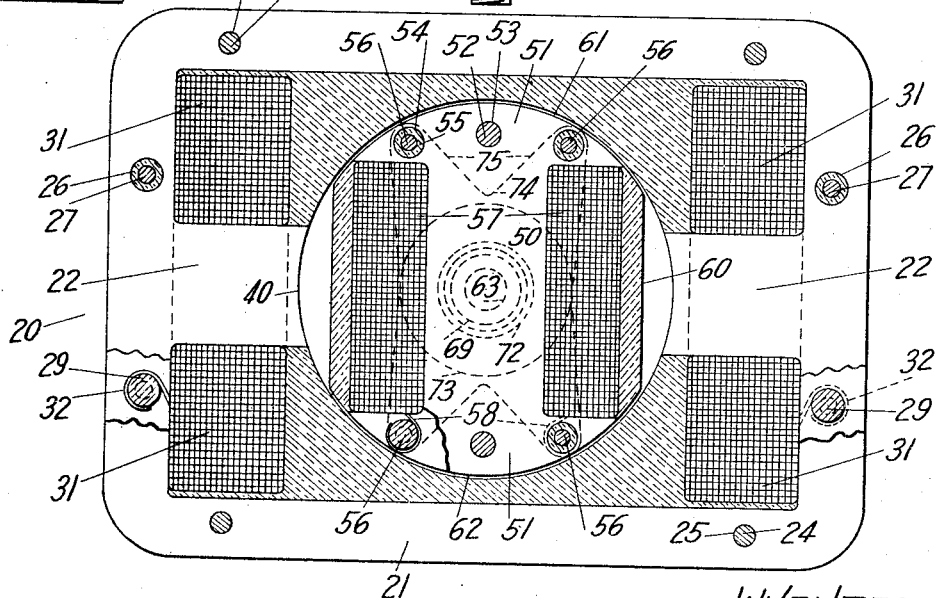
INVENTOR
Vincent G. Apple Patented Aug. 11, 1931

1,818,779

UNITED STATES PATENT OFFICE

VINCENT G. APPLE, OF DAYTON, OHIO

OSCILLATING MOTOR

Application filed September 6, 1929. Serial No. 390,714.

This invention relates to oscillating motors adapted to be oscillated through a part of a revolution against a resilient means by an electric current which is then interrupted to permit the resilient means to return the motor to its starting point through the part revolution through which it has been operated.

An object of the invention is to generally improve a motor of this character.

Another object is to provide more effective electric insulating means for the winding and terminals.

Another object is to provide improved means to convey the electric current from the stationary to the rotating element.

Still another object is to provide a non-hygroscopic covering around the current carrying elements to protect them from oil, moisture, acids or similar objectionable substances.

That these and many other objects and meritorious features are attained will be readily apparent to those skilled in the art from a consideration of the following description, reference being had to the drawing, wherein—

Fig. 1 is a top plan view partially in section, the left side being on the line 1—1 of Fig. 2.

Fig. 2 is a front elevation partially in section, the left side being approximately on the line 2—2 of Fig. 1.

Fig. 3 is an end elevation partially in section, the lower right hand corner being a section on the line 3—3 of Fig. 1.

Fig. 4 is a vertical section approximately on the line 4—4 of Fig. 1.

Fig. 5 is a horizontal section approximately on the line 5—5 of Fig. 2.

Fig. 6 is a vertical section on the line 6—6 of Fig. 1.

Fig. 7 is an inside view of the cover plate with parts broken away.

Fig. 8 is a section on the line 8—8 of Fig. 1.

Similar numerals refer to similar parts throughout the several views.

The laminated field core 20 of my motor is of the consequent pole bipolar type comprising the substantially rectangular frame portion 21 with the inturned poles 22. The laminæ 23 are held together by rivets 24 extending through holes 25 in the frame portion. Other holes 26 extend through several of the outer laminæ only, and insulation bushings 27 are tightly secured in these holes. Terminal posts 28 and 29 in turn fit tightly in bushings 27. Posts 29 differ from posts 28 only in that they have the tapped holes 30 at their outer ends.

The winding comprises coils 31 of magnet wire which encircle poles 22. The magnet wire employed as a preferred form is of that type having a covering of fibrous material or similar absorptive insulation, and is saturated with a liquid cementitious insulation either before or after the wire is wound into the coils, and baked to harden the coils after they are in place on the core. One end of each coil is connected to one or more posts 28 and the other ends to posts 29, making posts 28 terminals of one polarity and posts 29 terminals of the other polarity. Since the terminal posts lie closely along the edges of the coils, the connections are made without leaving any flexible leads or loose wire extending from the coils to the posts. This matter is important because wires which do not lie close to the coils to form a part thereof, but instead extend across open spaces from coils to terminal posts, may be torn off when the housing of plastic insulation is afterward pressed about the coils and posts to cover them.

As a conductive member for electrically connecting all terminal posts 28 to a common point the metal plate 33 is employed. This plate is of somewhat rectangular form, has four ears 34 at the ends corresponding in position to posts 28 and another ear 35 to which a binding post 36 is secured. A hub 37 is formed at the middle of the plate, and the inner diameter of this hub is adapted to receive a ball bearing upon which the armature oscillates.

Ears 34 are welded or similarly secured to terminal posts 28 with hub 37 concentric with the circular inner ends of poles 22. Plate 33 is thus adapted to a threefold purpose, the first of which is to convey current from the terminal posts 28 to binding post 36, the second to provide a rigid bearing support for the armature, and the third to present stationary surfaces 38 which a moving surface on the armature may contact to convey current from a moving armature winding to the binding post 36.

A housing 39 of hard molded insulation extends about the coils 31 and terminal posts 28 and 29 to cover them and through the space within the rectangular opening of the field core, forming a cylindrical chamber 40 within which the armature may rotate.

The insulation which surrounds plate 33 forms an end wall 41 which completely closes the armature chamber 40, the other end being removable to admit the armature.

The removable end 42 of the housing 39 has a circular extension 43 projecting into the armature chamber 40 to concentrically support it. Otherwise it is substantially a duplicate of the integral end 41. Its conductive plate 44 differs from plate 33 only in having holes 45 through the ears 34 through which screws 46 extend into tapped holes 30 of posts 29 to hold it in place. Another binding post 36 is secured in the ear 37 exactly as in the plate 33.

A slot 47 is provided to permit the oscillating arm 65 to extend from the armature chamber 40. For purposes of assembly slot 47 is formed by cutting away the end of the chamber 40 from the outer open end to the line 48, Fig. 1 then filling in the cut-away portion partway by providing an extending portion 49 on the removable end 42.

The armature core 50 is of the shuttle type, comprising a plurality of laminæ 51 held together by rivets 52 passing through holes 53. Other holes 54 extend through several of the outer laminæ only, and insulation bushings 55 are tightly secured in these holes. Terminal posts 56 fit tightly in bushings 55.

The winding comprises coils 57 which encircle the armature core and are insulation saturated and afterward hardened in substantially the same manner as the field coils, the beginning of the coil being connected to one or more terminal posts 56 at one end of the core and the end of the coil to one or more terminal posts at the other end of the core, the connections being made as at 58, Fig. 6, to obviate the necessity for leads or wires extending through open space from the coil to the post, which feature facilitates molding the jacket of plastic insulation as described relative to the field.

The insulation jacket 60 surrounds the coil and the entire core except at the pole faces 61 and 62. At each end a stub shaft 63 having a head 64 is imbedded in the jacket which extends outwardly in the form of a hub 69 around the shaft to hold it in concentric relation to the core.

The operating arm 65 has a large opening 66 at one end to clear head 64, a smaller opening 67 to clear one of the posts 56, and a still smaller opening 68 at its outer end to facilitate connection to a member to be reciprocated (see Fig. 2). The manner in which arm 65 is imbedded in the insulating mass electrically separates it from the conductive elements of the structure.

The jacket 60 which encloses the core 51, coil 57 and posts 56 stops short of the outer ends of the posts, leaving them exposed as at 70. A relatively flexible sheet metal member 71 comprises a hub portion 72 connecting a disc 73 and a plate 74, said plate having four arms 75, Fig. 2 extending outwardly and resting on the exposed ends 70 of the posts. The arms 75 electrically contact the ends 70 and are preferably welded thereto. Ball bearings 76 are supported on shafts 63 slightly removed from discs 73, the discs being in contact with the exposed surfaces 38 of plates 33 and 44 of the field, whereby the member 71 serves the twofold purpose of forming a closure for the ball bearings to retain their lubricant and a means to carry current between the stationary binding post of the field and the movable winding of the armature.

From the description and drawings it will be apparent that if the binding posts 36 are connected to a source of current supply the current will flow from one binding post through both field and armature winding to the other binding post, and that if the turns of the winding are in proper relative direction the operating arm 65 will be moved from the position shown to the line 77 (Fig. 2). Since the motor is primarily adapted to operate a reciprocable device which is spring returned after being operated in one direction, no spring return means are herein shown for returning the motor, although such means may be provided by the simple mechanical expedient of attaching a spring to the end of operating arm 65 to urge it in a direction opposite to that in which the motor is rotated upon energization of the magnets, so that, to operate and return the arm 65, it is only necessary to make and break the electric circuit with a simple hand or foot operated switch.

The preferred procedure for making the field element hereinbefore described consists in stacking the laminæ 23 and riveting them together with the rivets 24, putting in the bushings 27 and the posts 28 and 29, treating the wire and winding the coils 31, putting the coils over the poles 22 and connecting the ends of the wire to the terminal posts 28 and 29, riveting a binding post 36 into the plate 33, locating and welding the plate to the ends of the posts 28, placing a suitable form or brace about the structure to hold the coils in the exact position and shape desired and baking them in place both to permanently locate them and to harden them, placing the structure in a mold having a cavity of the exact shape desired for the outside contour of the housing and having a plug extending into said cavity having an outside form corresponding to the armature chamber 40 and the inside of hub 37, forcing insulation into the space within the mold not occupied by the other parts of the structure, hardening the insulation, then removing the structure from the mold.

The preferred procedure for making the separable end 42 of the housing consists in riveting a binding post 36 into plate 44, placing the structure into a mold having a cavity shaped like the desired outside contour of the housing ends and a plug extending into said cavity through the hub 37, molding insulation into the space left in the cavity by the plate and binding post assembly, hardening the insulation, then removing the finished end from the mold.

The preferred procedure for making the armature consists in stacking the laminæ 51 and securing them together with rivets 52, putting in the bushings 55 and the posts 56 into the bushings, insulation treating the wire and winding the coil 57 directly on the core, attaching the ends of the coil to the terminal posts 56, placing a suitable envelope or other bracing means about the winding to keep it in the exact shape desired while baking the coil, baking the coil until rigid, removing the envelope or bracing means, supporting the structure along with the shafts 63 in a mold having a cavity of the exact shape of the outside of the jacket which it is desired to mold about the coil, forcing insulation into the cavity, hardening the insulation, removing the structure from the mold, attaching the members 71 by welding their arms 75 to the posts 56 and forcing the bearings 76 on the shafts 63 against the ends of the hubs 69.

Having described an embodiment of my invention and indicated a preferred procedure for making it, I claim—

1. In a dynamo electric machine, a structure comprising a magnetizable core, a winding on said core, a hollow housing of insulation having a cylindrical chamber closed by an end wall at each end, said core and winding being imbedded in said insulation, and two conductive members, one enclosed in each end wall, one end of said winding being electrically connected to one said conductive member and the other end to the other said conductive member, said conductive members having exposed contact surfaces in said end walls on the inside of said chamber.

2. In a dynamo electric machine, a structure comprising a magnetizable core, a winding on said core, a hollow housing of insulation having a cylindrical chamber closed by an end wall at each end, said core and winding being imbedded in said insulation, and two conductive members, one enclosed in each end wall, one end of said winding being electrically connected to one said conductive member and the other end to the other said conductive member, said conductive members having exposed annular tracks in the said end walls on the inside of said cylindrical chamber and concentric therewith.

3. In a dynamo electric machine, a structure comprising a magnetizable core, a winding on said core, a hollow housing of insulation having a cylindrical chamber closed by an end wall at each end, said core and winding being imbedded in said insulation, two conductive members, one enclosed in each end wall, one end of said winding being electrically connected to one said conductive member and the other to the other said conductive member, a binding post extending from each conductive member outwardly through said insulation through each end wall and a bearing hub formed in each conductive member and having the outer ends closed by the end walls.

4. In a dynamo electric machine, a structure comprising a magnetizable core, a winding on said core, axially extending terminal posts at each end of the core, mechanically joined thereto but electrically insulated therefrom, one end of the winding being electrically connected to a terminal post at one end of the core and the other end to a terminal post at the other end of the core, conductive members mechanically supported on and electrically connected to said terminal posts, and a hollow housing of insulation having a cylindrical chamber closed at both ends, said core, winding, terminal posts and conductive members being imbedded in said insulation, said conductive members having exposed annular tracks concentric with said chamber on the inside of the end walls thereof.

5. In a dynamo electric machine, a structure comprising a magnetizable core, a winding on said core, axially extending terminal posts at each end of the core, mechanically joined thereto but electrically insulated therefrom, one end of the winding being electrically connected to a terminal post at one end of the core and the other end to a terminal post at the other end of the core, a jacket of insulation surrounding said core, winding and terminal posts, said terminal posts being exposed at their outer ends, and a resilient contact member supported on and electrically joined to the terminal posts, one said member at each end of the structure.

6. In a dynamo electric machine, a structure comprising a magnetizable core, a winding on said core, axially extending terminal posts at each end of the core, mechanically joined thereto but electrically insulated therefrom, one end of the winding being electrically connected to a terminal post at one end of the core and the other end to a terminal post at the other end of the core, a jacket of insulation surrounding said core, winding and terminal posts, said terminal posts being exposed at their outer ends, a resilient contact member at each end supported on and electrically joined to the terminal posts, and a stub shaft imbedded in and supported by the insulation at each end of the structure.

7. A dynamo electric machine rotor, adapted for part rotation only, comprising a magnetizable core, a winding on said core, a jacket of insulation surrounding said winding, a stub shaft at each end of the rotor and an operating arm, the stub shafts and the operating arm being imbedded in and wholly supported by said jacket.

8. In a dynamo electric machine, a stator comprising a magnetizable stator core, a stator winding on said stator core, a hollow housing of insulation having a cylindrical chamber closed by an end wall at each end, said stator core and stator winding being imbedded in said insulation, and two conductive members one enclosed in each end wall, one end of said stator winding being electrically connected to one said conductive member and the other end to the other of said conductive member, said conductive members having bearing supporting hubs formed therein and annular contact surfaces exposed at the ends of said hubs within said cylindrical chamber, and a rotor within said cylindrical chamber comprising a magnetizable rotor core, a rotor winding on said rotor core, a jacket of insulation surrounding said rotor winding, terminal posts and stub shafts, imbedded in and supported by said insulation at both ends of said rotor core, bearings on said stub shafts within said bearing supporting hubs and a resilient contact member carried by said terminal posts at each end of said rotor core in contact with said annular contact surfaces said rotor winding having one end electrically joined to one of said resilient contact members and the other end to the other resilient contact member.

In testimony whereof I affix my signature.

VINCENT G. APPLE.